(12) United States Patent
Fujita et al.

(10) Patent No.: US 11,419,118 B2
(45) Date of Patent: Aug. 16, 2022

(54) ROADSIDE RADIO DEVICE AND RADIO COMMUNICATION SYSTEM

(71) Applicant: RENESAS ELECTRONICS CORPORATION, Tokyo (JP)

(72) Inventors: Suguru Fujita, Tokyo (JP); Takashi Tono, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 38 days.

(21) Appl. No.: 17/036,904

(22) Filed: Sep. 29, 2020

(65) Prior Publication Data

US 2021/0136761 A1 May 6, 2021

(30) Foreign Application Priority Data

Nov. 5, 2019 (JP) .............................. JP2019-200647

(51) Int. Cl.
| | |
|---|---|
| *H04W 72/04* | (2009.01) |
| *H04W 4/44* | (2018.01) |
| *H04W 12/12* | (2021.01) |
| *H04W 12/122* | (2021.01) |

(52) U.S. Cl.
CPC ......... *H04W 72/0453* (2013.01); *H04W 4/44* (2018.02); *H04W 12/122* (2021.01)

(58) Field of Classification Search
CPC .. H04W 72/0453; H04W 4/44; H04W 12/122
See application file for complete search history.

(56) References Cited

U.S. PATENT DOCUMENTS

| | | | |
|---|---|---|---|
| 10,111,264 B2 | 10/2018 | Oshida | |
| 2019/0147668 A1* | 5/2019 | Ravi | .................. H04M 1/72463 |

FOREIGN PATENT DOCUMENTS

JP 2017-028654 A 2/2017

OTHER PUBLICATIONS

Extended European Search Report issued in corresponding European Patent Application No. 20205616.4-1218, dated Mar. 19, 2021.

* cited by examiner

*Primary Examiner* — Ronald B Abelson
(74) *Attorney, Agent, or Firm* — McDermott Will & Emery LLP

(57) ABSTRACT

A roadside radio device includes a first radio unit which receives a radio data packet from an in-vehicle radio device, and a first application unit which receives application data included in the radio data packet. A first application unit includes a vehicle class information comparison unit which compares vehicle identification information with communication type information. When the vehicle class information comparison unit determines that the vehicle identification information and the communication type information match, the first application unit processes the application data received from the first radio unit. When the vehicle class information comparison unit determines that the vehicle identification information and the communication type information do not match, the first application unit treats, as invalid data, the application data received from the first radio unit.

16 Claims, 13 Drawing Sheets

ROADSIDE RADIO DEVICE AND RADIO COMMUNICATION SYSTEM

CROSS-REFERENCE TO RELATED APPLICATIONS

The disclosure of Japanese Patent Application No. 2019-200647 filed on Nov. 5, 2019 including the specification, drawings and abstract is incorporated herein by reference in its entirety.

BACKGROUND

This disclosure relates to a roadside radio device and a radio communication system.

Radio communication technology in automobiles such as vehicle-to-vehicle communication and road-to-vehicle communication is known. The need for security in these radio communication technologies has become increasingly important in the practical application of automatic operation technologies.

There are disclosed techniques listed below.
[Patent Document 1] Japanese Unexamined Patent Application Publication No. 2017-28654

For example, Patent Document 1 discloses a technique for detecting spoofing caused by replay attacks.

There is a threat that external time information is tampered with by a malicious third party modifying a Global Positioning System (GPS) module. The technique disclosed in Patent Document 1 verifies whether the external time information has been tampered with by comparing the newly acquired external time information and the internal time information before the power is turned on, after the power supply to the Vehicle to X (V2X) module is restarted.

SUMMARY

However, when the radio communication device is a spoofing radio communication device due to tampering with the application executed by the application unit of the radio communication device, the spoofing radio communication device cannot be detected by the technique disclosed in Patent Document 1.

Other objects and novel features will be apparent from the description of this specification and the accompanying drawings.

A roadside radio device according to one embodiment includes a first radio unit which receives a radio data packet from an in-vehicle radio device, and a first application unit which receives application data included in the radio data packet. A first application unit includes a vehicle class information comparison unit which compares vehicle identification information with communication type information. When the vehicle class information comparison unit determines that the vehicle identification information and the communication type information match, the first application unit processes the application data received from the first radio unit. When the vehicle class information comparison unit determines that the vehicle identification information and the communication type information do not match, the first application unit treats, as invalid data, the application data received from the first radio unit.

According to one embodiment, the roadside radio device can detect the spoofing radio device even when the in-vehicle radio device is the spoofing radio device due to tampering with the application part of the in-vehicle radio device.

DETAILED DESCRIPTION

Figure 1:
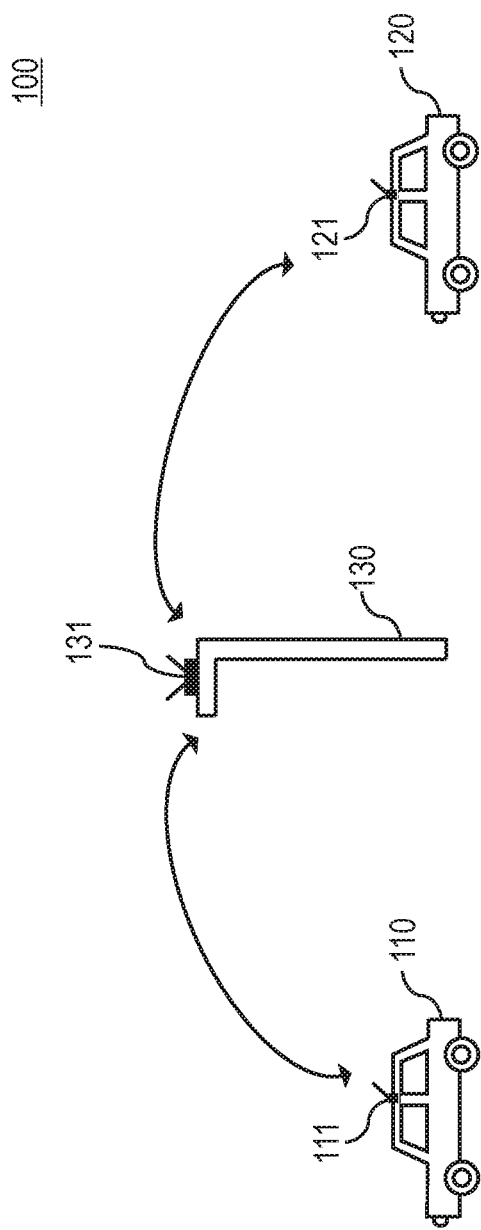
FIG. 1 is a diagram showing an example of a configuration of a radio communication system according to a first embodiment.

Hereinafter, embodiments of the present will be described in detail with reference to the drawings. In the specification and the drawings, the same or corresponding components are denoted by the same reference numerals, and a repetitive description thereof is omitted. In the drawings, for convenience of description, the configuration may be omitted or simplified.

First Embodiment

FIG. 1 is a diagram showing an example of a configuration of a radio communication system 100 according to a first embodiment. As shown in FIG. 1, the radio communication system 100 includes a radio communication device 111 mounted in a vehicle 110, a radio communication device 121 mounted in a vehicle 120, and a radio communication device 131 mounted in a roadside apparatus 130. Hereinafter, the radio communication devices 111 and 121 are referred to as in-vehicle radio devices 111 and 121. The radio communication device 131 is also referred to as a roadside radio device 131.

The vehicles 110 and 120 transmit and receive messages to and from the roadside radio device 131 mounted in the roadside apparatus 130 using the in-vehicle radio device 111 mounted in the vehicle 110 and the in-vehicle radio device 121 mounted in the vehicle 120. The messages transmitted from the vehicles 110 and 120 include vehicle information such as, for example, the speed and traveling direction of the own vehicle. The vehicles 110 and 120 may exchange vehicle information with each other via the roadside apparatus 130. In addition, a message including highly reliable surrounding information is transmitted from the roadside apparatus 130 to the vehicles 110 and 120. The vehicles 110 and 120 can appropriately perform driving control, such as maintaining inter-vehicle distance, by transmitting and receiving these messages.

The radio communication system 100 of FIG. 1, in addition to the in-vehicle radio devices 111 and 121, includes many vehicle radio devices mounted in vehicles (not shown). In addition, the in-vehicle radio devices included in the radio communication system 100 execute various applications and transmit and receive many messages. In this way, in the radio communication system 100 in which many messages are transmitted and received, securing sufficient communication resources is important in realizing stable communication.

However, for example, when the in-vehicle radio device 121 is a spoofing radio device, communication resources are wastefully consumed by messages transmitted from the spoofing radio device. That is, if the communication resource is not sufficiently secured, a normal radio communication device, for example, the in-vehicle radio device 111 or the roadside radio device 131 may not be able to properly transmit the message. To avoid this situation, it is necessary to properly detect the spoofing radio device and to exclude the detected spoofing radio device from the radio communication system 100. Hereinafter, a mechanism for detecting and excluding the spoofing radio device will be described.

Figure 2:
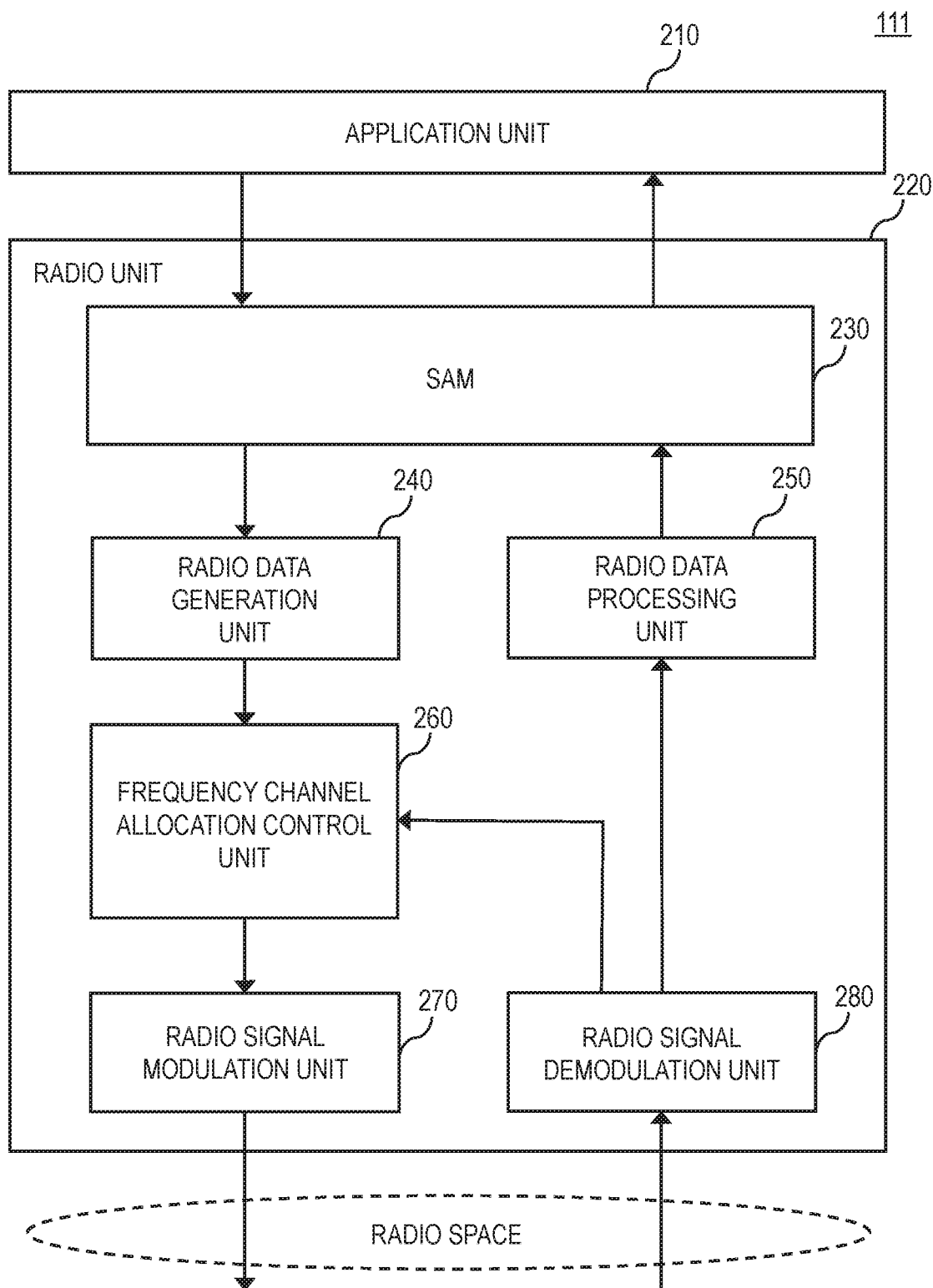
FIG. 2 is a block diagram showing an example of a configuration of an in-vehicle radio device according to the first embodiment.

Next, the in-vehicle radio device according to the first embodiment will be described. FIG. 2 is a block diagram showing an example of a configuration of the in-vehicle radio device 111 according to the first embodiment. Since the in-vehicle radio devices 111 and 121 have the same configuration, only the configuration of the in-vehicle radio device 111 is described here. As shown in FIG. 2, the in-vehicle radio device 111 includes an application unit (second application unit) 210 and a radio unit (second radio unit) 220. The application unit 210 and the radio unit 220 are connected to each other.

When the in-vehicle radio device 111 starts data transmission processing to the roadside radio device 131, the application unit 210 generates an application data packet. The application unit 210 outputs the application data packet to the radio unit 220.

The application data packet includes an application header, communication type information, and application data. The application header is information indicating the head of the application data packet. The communication type information is information indicating a vehicle to which the application data relates. The application data is data processed by the application.

The communication type information is indicated by vehicle class information. The vehicle class information is information that identifies whether a vehicle is a general vehicle or a special vehicle. The special vehicles include emergency vehicles and passenger vehicles. For example, an ambulance vehicle, a firefighting vehicle, a police vehicle, or the like is exemplified as the emergency vehicle. A bus, a taxi, a rail vehicle, or the like is exemplified as the passenger vehicle. The special vehicle may distinguish between the emergency vehicle and the passenger vehicle.

In addition, when the in-vehicle radio device 111 performs the reception processing of the data from the roadside radio device 131, the application unit 210 receives a demodulated application data packet from the radio unit 220. The application unit 210 processes the application data included in the received application data packet.

The radio unit 220 includes a Secure Application Module (SAM) 230, a radio data generation unit 240, a radio data processing unit 250, a frequency channel allocation control unit (second frequency channel allocation control unit) 260, a radio signal modulation unit 270, and a radio signal demodulation unit 280.

The SAM 230 is connected to the application unit 210. When performing the transmission processing, the SAM 230 receives the application data packet from the application unit 210. The SAM 230 generates a SAM data packet by appending a SAM header and application related information to the application data packet. The SAM 230 is connected to the radio data generation unit 240, and outputs the generated SAM data packet to the radio data generation unit 240.

The SAM header is information indicating the head of the SAM data packet. The application related information includes vehicle identification information and reserved area data. The vehicle identification information is information indicating the vehicle in which the in-vehicle radio device 111 is mounted. The vehicle identification information is indicated by the vehicle class information like the communication type information. That is, the vehicle class information is commonly used in the vehicle identification information and the communication type information. The reserved area data is data of the spare information area in preparation for future system expansion.

In addition, the SAM 230 is connected to the radio data processing unit 250, When performing the reception processing, the SAM 230 receives a demodulated SAM data packet from the radio data processing unit 250. The SAM 230 demodulates the application data packet from the demodulated SAM data packet. Specifically, the SAM 230 removes the SAM header and the application related information from the demodulated SAM data packet and demodulates the application data packet. At this time, the SAM 230 performs processing of including the part of the removed information in the application data. In this way, the demodulated application data packet is output from the SAM 230 of the radio unit 220 to the application unit 210.

The radio data generation unit 240 generates a radio data packet by appending a radio unit header including information for radio communication to the SAM data packet received from the SAM 230. The radio data generation unit 240 is connected to the frequency channel allocation control unit 260 and outputs the radio data packet to the frequency channel allocation control unit 260.

The radio unit header includes a preamble (PA), a frequency channel, a Media Access Control (MAC) address, and a radio type. The preamble is information for detecting the presence or absence of radio data. The frequency channel is information indicating a frequency channel used in radio communication. The MAC address is information for identifying a radio device. The radio type is information indicating whether the data to be transmitted is data related to a frequency channel request. Since the radio data packet output from the radio data generation unit 240 is not data related to the frequency channel request, the radio type indicates that the data to be transmitted is not data related to the frequency channel request.

The frequency channel allocation control unit 260 is connected to the radio signal modulation unit 270. The frequency channel allocation control unit 260 confirms whether the frequency channel for radio communication is allocated to the in-vehicle radio device 111. When confirming that the frequency channel is allocated, the frequency channel allocation control unit 260 outputs the radio data packet received from the radio data generation unit 240 to the radio signal modulation unit 270.

On the other hand, when confirming that the frequency channel for radio communication is not allocated to the in-vehicle radio device 111, the frequency channel allocation control unit 260 generates a frequency channel request signal. The frequency channel allocation control unit 260 outputs the frequency channel request signal to the radio signal modulation unit 270.

Figure 3:
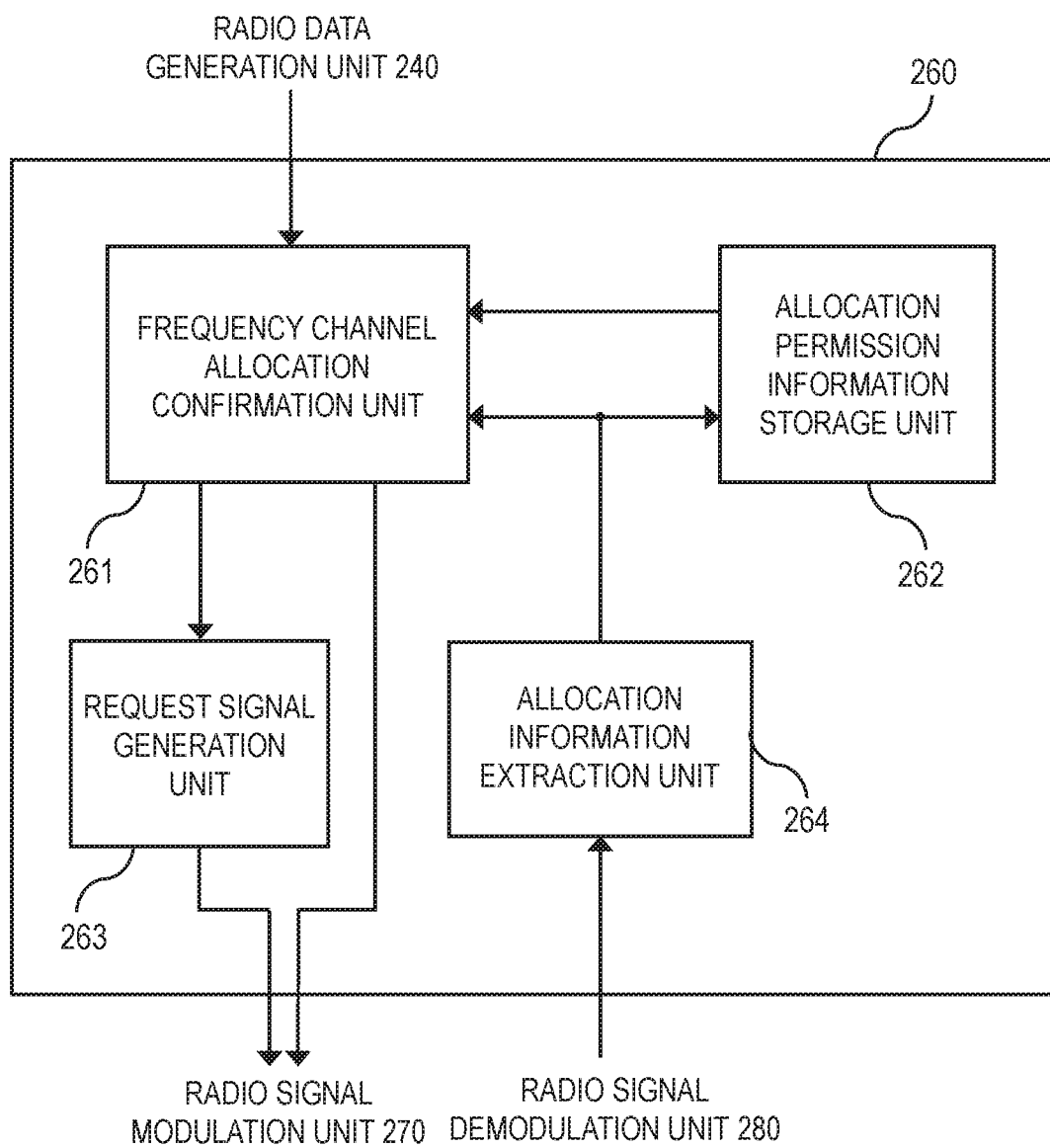
FIG. 3 is a block diagram showing an example of a configuration of a frequency channel allocation control unit according to the first embodiment.

Here, with reference to FIG. 3, a configuration of the frequency channel allocation control unit 260 will be described in detail. FIG. 3 is a block diagram showing an example of the configuration of the frequency channel allocation control unit 260 according to the first embodiment. As shown in FIG. 3, the frequency channel allocation control unit 260 includes a frequency channel allocation confirmation unit 261, an allocation permission information storage unit 262, a request signal generation unit 263, and an allocation information extraction unit 264.

The allocation permission information storage unit 262 stores frequency channel allocation permission information. The frequency channel allocation permission information is information indicating a frequency channel allocated to the in-vehicle radio device 111 for radio communication.

The frequency channel allocation confirmation unit 261 is connected to the radio data generation unit 240, the radio signal modulation unit 270, the allocation permission information storage unit 262, and the request signal generation unit 263, The frequency channel allocation confirmation unit 261 confirms whether the frequency channel for radio communication is allocated to the in-vehicle radio device 111 based on the frequency channel allocation permission information. More specifically, when receiving the radio data packet from the radio data generation unit 240, the frequency channel allocation confirmation unit 261 reads out the frequency channel allocation permission information from the allocation permission information storage unit 262. The frequency channel allocation confirmation unit 261 compares the read frequency channel allocation permission information with the frequency channel included in the radio unit header of the radio data packet. By performing this comparison processing, the frequency channel allocation confirmation unit 261 confirms whether the frequency channel for radio communication is allocated to the in-vehicle radio device 111.

When confirming that the frequency channel for radio communication is allocated to the in-vehicle radio device 111, the frequency channel allocation confirmation unit 261 outputs the radio data packet received from the radio data generation unit 240 to the radio signal modulation unit 270.

On the other hand, when confirming that the frequency channel for radio communication is not allocated to the in-vehicle radio device 111, the frequency channel allocation confirmation unit 261 outputs a control signal for instructing generation of the frequency channel request signal to the request signal generation unit 263.

When receiving the control signal from the frequency channel allocation confirmation unit 261, the request signal generation unit 263 generates a frequency channel request signal for requesting the in-vehicle radio device 111 to allocate a frequency channel for radio communication. The generated frequency channel request signal is output from the request signal generation unit 263 to the radio signal modulation unit 270.

The request signal generation unit 263 arranges the radio unit header at the head of the frequency channel request signal. The radio type of the radio unit header indicates information indicating that the data to be transmitted is data related to the frequency channel request. In addition, the frequency channel in the radio unit header shows a combination of the frequency channels for the frequency channel request.

The allocation information extraction unit 264 is connected to the radio signal demodulation unit 280, the frequency channel allocation confirmation unit 261, and the allocation permission information storage unit 262. The allocation information extraction unit 264 receives the demodulated frequency channel allocation signal from the radio signal demodulation unit 280. At this time, the allocation information extraction unit 264 can recognize that the received signal is a frequency channel allocation signal by referring to the radio type of the radio unit header of the signal (data string) received from the radio signal demodulation unit 280.

Further, the allocation information extraction unit 264 extracts information of the frequency channel to be permitted from the frequency channel allocation signal. The allocation information extraction unit 264 notifies the frequency channel allocation confirmation unit 261 of the extracted information of the frequency channel. In addition, the allocation information extraction unit 264 registers the extracted information of the frequency channel as information of the frequency channel allocated to the in-vehicle radio device 111 in the frequency channel allocation information of the allocation permission information storage unit 262.

The frequency channel allocation confirmation unit 261 continues to output the control signal for instructing the generation of the frequency channel allocation request signal to the request signal generation unit 263 until the allocation information extraction unit 264 notifies the frequency channel allocation confirmation unit 261 of the frequency channel allocation permission information. In other words, while receiving the control signal, the request signal generation unit 263 repeatedly generates the frequency channel request signal at predetermined intervals.

Returning to FIG. 2, the description of the configuration of the in-vehicle radio device 111 will be continued. The radio signal modulation unit 270 is connected to the frequency channel allocation control unit 260. When receiving the radio data packet from the frequency channel allocation control unit 260, the radio signal modulation unit 270 performs modulation processing on the radio data packet received from the frequency channel allocation control unit 260 using the allocated frequency channel. The radio signal modulation unit 270 radiates the radio signal of the radio data packet generated by performing the modulation processing to the radio space via an antenna (not shown). In this manner, the radio unit 220 of the in-vehicle radio device 111 transmits the radio data packet to the roadside radio device 131 using the allocated frequency channel. The transmitted radio data packet includes the vehicle identification information given by the radio unit 220 and the communication type information given by the application unit 210.

In addition, when receiving the frequency channel request signal from the frequency channel allocation control unit 260, the radio signal modulation unit 270 performs modulation processing on the frequency channel request signal using the combination of the frequency channels for the frequency channel request. The radio signal modulation unit 270 radiates the radio signal of the frequency channel request signal generated by performing the modulation processing to the radio space via the antenna (not shown). In this manner, the radio unit 220 of the in-vehicle radio device 111 transmits the frequency channel request signal to the roadside radio device 131 using the combination of the frequency channels for the frequency channel request.

The radio signal demodulation unit 280 is connected to the radio data processing unit 250 and the frequency channel allocation control unit 260. The radio signal demodulation unit 280 receives a radio signal transmitted from the roadside radio device 131 via the antenna (not shown). The radio signal demodulation unit 280 performs demodulation processing, that is, frequency conversion processing and decoding processing on the received radio signal.

The radio signal demodulation unit 280 demodulates the radio data packet or the frequency channel allocation signal by performing the demodulation processing on the received radio signal. The demodulated radio data packet is output to the radio data processing unit 250. In addition, the demodulated frequency channel allocation signal is output to the frequency channel allocation control unit 260.

The radio data processing unit 250 is connected to the radio signal demodulation unit 280 and the SAM 230. The radio data processing unit 250 receives the demodulated radio data packet from the radio signal demodulation unit 280. At this time, the radio data processing unit 250 can recognize that the received signal is a radio data packet by referring to the radio type of the radio unit header of the signal (data string) received from the radio signal demodulation unit 280.

In addition, the radio data processing unit 250 performs demodulation processing on the radio data packet to demodulate the SAM data packet. Specifically, the radio data processing unit 250 performs processing of removing the radio unit header from the radio data packet and including a part of the information included in the removed radio unit header, for example, the information of the MAC address, in the application data. In this way, the SAM data packet on which the demodulation processing is performed is output from the radio data processing unit 250 to the SAM 230.

Figure 4:
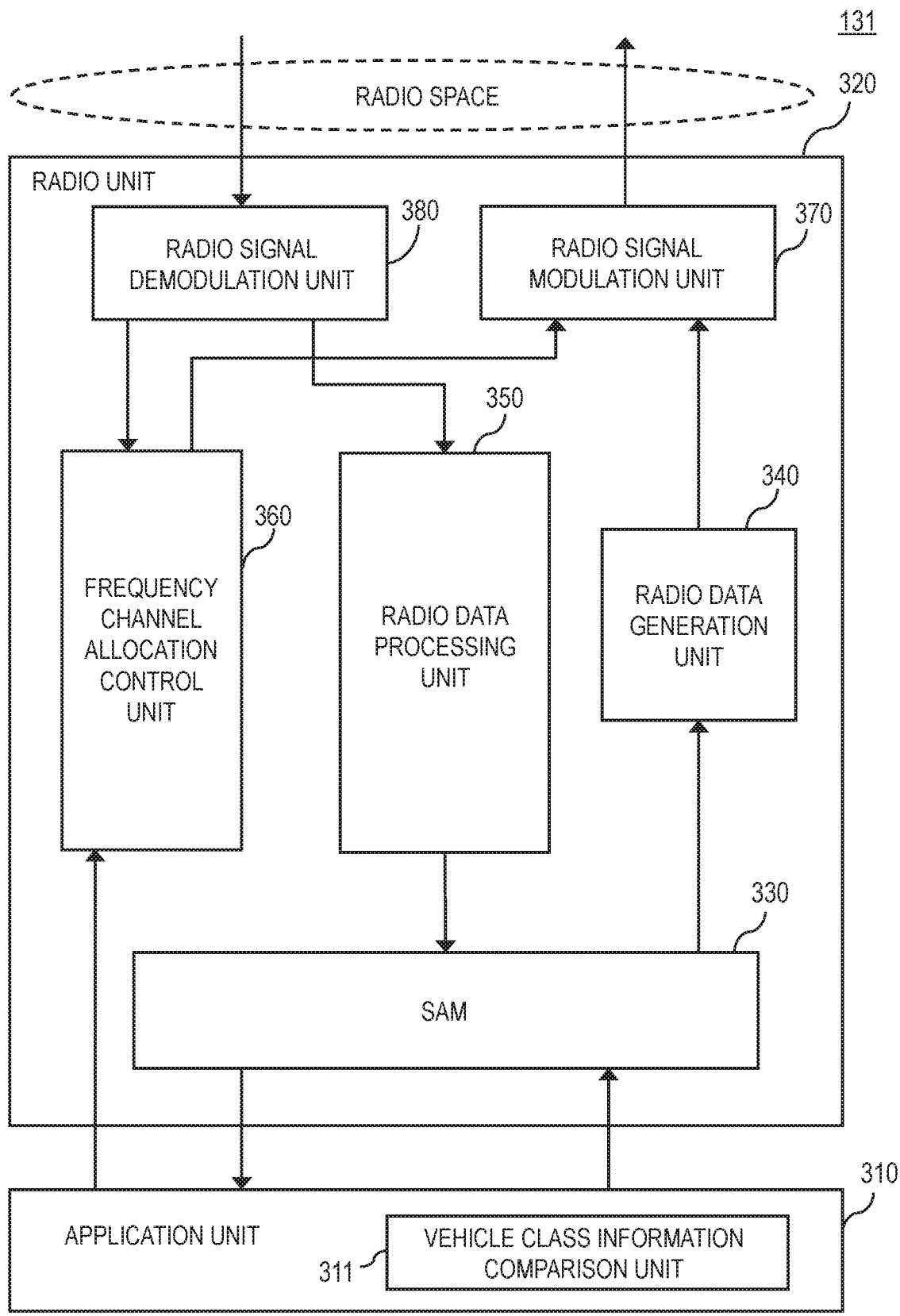
FIG. 4 is a block diagram showing an example of configuration of a roadside radio device according to the first embodiment.

Next, the roadside radio device according to the first embodiment will be described. FIG. 4 is a block diagram showing an example of a configuration of the roadside radio device 131 according to the first embodiment. The roadside radio device 131 performs the radio communication with the in-vehicle radio devices 111 and 121, but only the radio communication between the roadside radio device 131 and the in-vehicle radio device 111 is illustrated here. As shown in FIG. 4, the roadside radio device 131 includes an application unit (first application unit) 310 and a radio unit (first radio unit) 320. The application unit 310 and the radio unit 320 are connected to each other.

The radio unit 320 includes a SAM (first SAM) 330, a radio data generation unit 340, a radio data processing unit 350, a frequency channel allocation control unit (first frequency channel allocation control unit) 360, a radio signal modulation unit 370, and a radio signal demodulation unit 380.

The radio signal demodulation unit 380 is connected to the radio data processing unit 350 and the frequency channel allocation control unit 360. The radio signal demodulation unit 380 receives a radio signal transmitted from the in-vehicle radio device 111 via an antenna (not shown). The radio signal demodulation unit 380 performs demodulation processing, that is, frequency conversion processing and decoding processing on the received radio signal.

The radio signal demodulation unit 380 performs the demodulation processing on the received radio signal to demodulate the radio data packet or the frequency channel request signal. The demodulated radio data packet is output to the radio data processing unit 350. In addition, the demodulated frequency channel request signal is output to the frequency channel allocation control unit 360. In this manner, the radio unit 320 of the roadside radio device 131 receives the radio data packet and the frequency channel request signal transmitted from the in-vehicle radio device 111.

The radio data processing unit 350 is connected to the radio signal demodulation unit 380 and the SAM 330, The radio data processing unit 350 receives the demodulated radio data packet from the radio signal demodulation unit 380.

The radio data processing unit 350 performs demodulation processing on the radio unit header included in the radio data packet to demodulate the SAM data packet. Specifically, the radio data processing unit 350 performs processing of removing the radio unit header from the radio data packet and including a part of the information included in the removed radio unit header, for example, the information of the MAC address, in the application data. The radio data processing unit 350 outputs the SAM data packet demodulated in this manner to the SAM 330.

The frequency channel allocation control unit 360 is connected to the radio signal demodulation unit 380, the radio signal modulation unit 370 and the application unit 310. When receiving the demodulated frequency channel request signal from the radio signal demodulation unit 380, the frequency channel allocation control unit 360 determines whether it is possible to allocate the frequency channel for radio communication to the in-vehicle radio device 111 of the transmission source (request source) based on the information of the spoofing radio device. When determining that it is possible to allocate the frequency channel, the frequency channel allocation control unit 360 generates a frequency channel allocation signal including information of the frequency channel to be permitted. The frequency channel allocation control unit 360 outputs the generated frequency channel allocation signal to the radio signal modulation unit 370.

Figure 5:
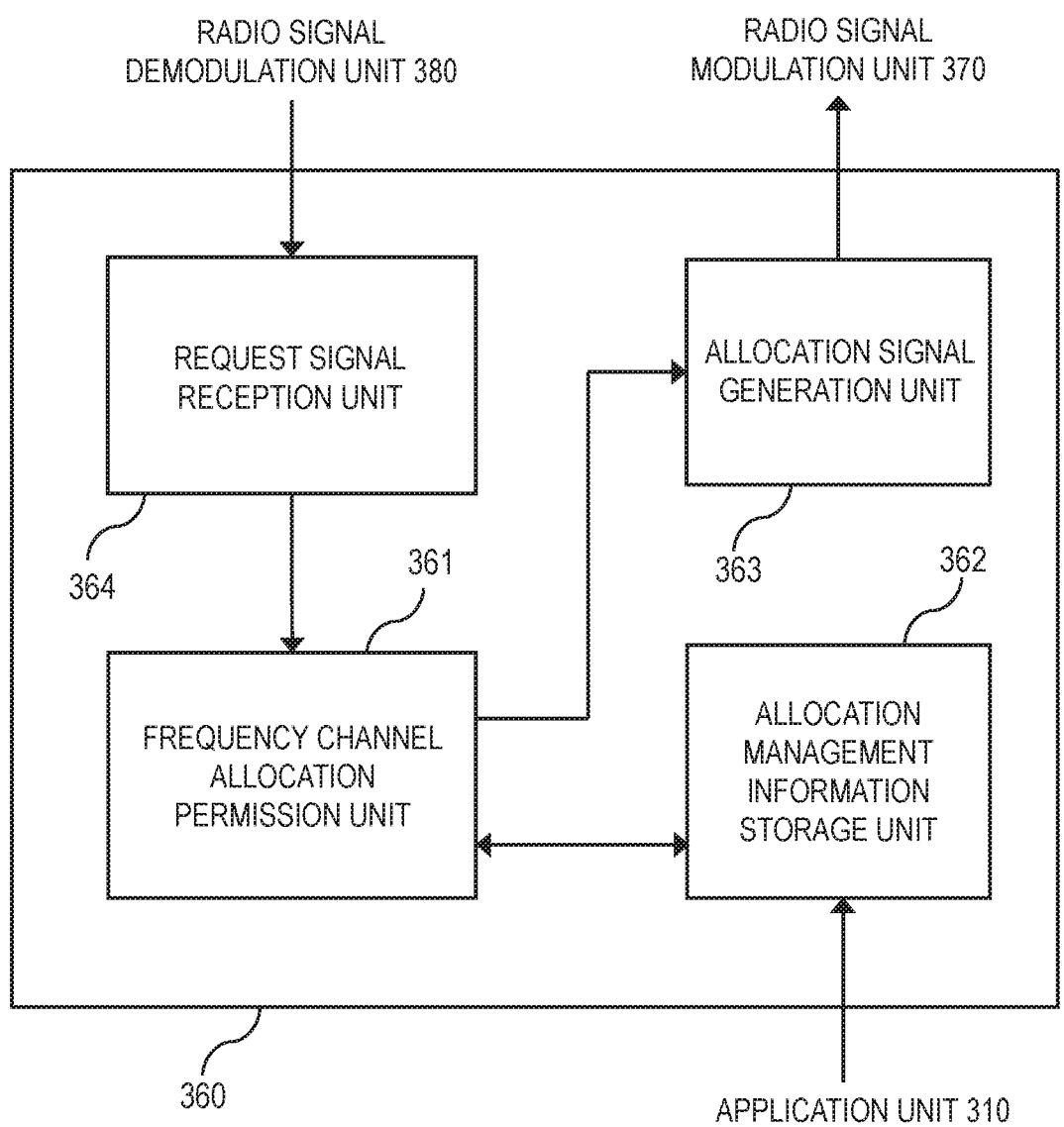
FIG. 5 is a block diagram showing an example of a configuration of a frequency channel allocation control unit according to the first embodiment.

Referring now to FIG. 5, a configuration of the frequency channel allocation control unit 360 will be described in detail. FIG. 5 is a block diagram showing an example of the configuration of the frequency channel allocation control unit 360 according to the first embodiment. As shown in FIG. 5, the frequency channel allocation control unit 360 includes a frequency channel allocation permission unit 361, an allocation management information storage unit 362, an allocation signal generation unit 363, and a request signal reception unit 364.

The allocation management information storage unit 362 stores frequency channel allocation management information. The frequency channel allocation management information includes information of the frequency channels that can be allocated to the in-vehicle radio. In addition, the allocation management information storage unit 362 is connected to the application unit 310. The allocation management information storage unit 362 receives the information of the spoofing radio device (e.g., the MAC address of the spoofing radio device) from the application unit 310 and registers the information in the frequency channel allocation management information. That the frequency channel allocation management information includes the information of the frequency channel that can be allocated to the in-vehicle radio and the information of the spoofing radio device.

The request signal reception unit 364 is connected to the radio signal demodulation unit 380 and the frequency channel allocation permission unit 361. The request signal reception unit 364 receives the demodulated frequency channel request signal from the radio signal demodulation unit 380 by referring to the radio type of the radio unit header. The request signal reception unit 364 outputs the frequency channel request signal to the frequency channel allocation permission unit 361.

The frequency channel allocation permission unit 361 is connected to the request signal reception unit 364, the allocation management information storage unit 362 and the allocation signal generation unit 363. The frequency channel allocation permission unit 361 operates in response to the frequency channel request signal transmitted from the in-vehicle radio device 111 and determines whether to allocate the frequency channel for radio communication to the in-vehicle radio device 111 based on the frequency channel allocation management information. When determining to allocate the frequency channel to the in-vehicle radio device 111, the frequency channel allocation permission unit 361 determines the frequency channel to be permitted to the in-vehicle radio device 111.

Specifically, when receiving the frequency channel request signal transmitted from the in-vehicle radio device 111 from the request signal reception unit 364, the frequency channel allocation permission unit 361 reads out the frequency channel allocation management information from the allocation management information storage unit 362. The frequency channel allocation permission unit 361 confirms whether there is a frequency channel that can be allocated to the in-vehicle radio device based on the read frequency channel allocation management information.

Further, based on the read frequency channel allocation management information, the frequency channel allocation permission unit 361 confirms whether the in-vehicle radio device 111 that is the transmission source of the frequency channel request signal is registered as a spoofing radio device. Specifically, the frequency channel allocation permission unit 361 confirms whether the MAC address included in the radio unit header of the frequency channel request signal is registered in the frequency channel allocation management information as the MAC address of the spoofing radio device.

When determining that there is the frequency channel that can be allocated to the in-vehicle radio device and that the in-vehicle radio device 111 that is the transmission source of the frequency channel request signal is not the spoofing radio device, the frequency channel allocation permission unit 361 determines the frequency channel for radio communication to be permitted to the in-vehicle radio device 111. The frequency channel allocation permission unit 361 outputs the information of the frequency channel to be permitted to the allocation signal generation unit 363, and outputs a control signal for instructing generation of the frequency channel allocation signal.

Further, the frequency channel allocation permission unit 361 outputs the frequency channel to be permitted to the in-vehicle radio device to the allocation management information storage unit 362. The allocation management information storage unit 362 includes the information of the frequency channel in the frequency channel allocation management information. In this way, the information of the frequency channel that can be allocated to the in-vehicle radio included in the frequency channel allocation management information is updated.

On the other hand, when determining that there is not the frequency channel that can be allocated to the in-vehicle radio device or that the in-vehicle radio device 111, which is the transmission source of the frequency channel request signal, is the spoofing radio device, the frequency channel allocation permission unit 361 treats the frequency channel request signal as an invalid signal. For example, the frequency channel allocation permission unit 361 does not process the frequency channel request signal or discards the frequency channel request signal. In this case, the frequency channel allocation permission unit 361 does not allocate the frequency channel for radio communication to the in-vehicle radio device 111 that is the transmission source of the frequency channel request signal.

The allocation signal generation unit 363 is connected to the frequency channel allocation permission unit 361 and the radio signal modulation unit 370. When receiving the information of the frequency channel to be permitted and the control signal for instructing the generation of the frequency channel allocation signal from the frequency channel allocation permission unit 361, the allocation signal generation unit 363 generates the frequency channel allocation signal including the information of the frequency channel to be permitted to the in-vehicle radio device 111. The generated frequency channel allocation signal is output from the allocation signal generation unit 363 to the radio signal modulation unit 370.

Incidentally, the allocation signal generation unit 363 arranges the radio unit header at the head of the frequency channel allocation signal. The radio type of the radio unit header indicates information indicating that the data to be transmitted is data related to the frequency channel request. In addition, the frequency channel in the radio unit header shows a combination of the frequency channels for the frequency channel request.

Returning to FIG. 4, the description of the configuration of the roadside radio device 131 will be continued. The radio signal modulation unit 370 is connected to the frequency channel allocation control unit 360 and the radio data generation unit 340. When receiving the radio data packet from the radio data generation unit 340, the radio signal modulation unit 370 performs modulation processing on the radio data packet received from the radio data generation unit 340 using a frequency channel dedicated to the roadside radio device 131. The radio signal modulation unit 370 radiates the radio signal of the radio data packet generated by performing the modulation processing to the radio space via the antenna (not shown). In this manner, the radio unit 320 of the roadside radio device 131 transmits the radio data packet to the in-vehicle radio device 111.

In addition, when receiving the frequency channel allocation signal from the frequency channel allocation control unit 360, the radio signal modulation unit 370 performs modulation processing on the frequency channel allocation signal using the frequency channel dedicated to the roadside radio device 131. The radio signal modulation unit 370 radiates the radio signal of the frequency channel allocation signal generated by performing the modulation processing to the radio space via the antenna (not shown). In this manner, the radio unit 320 of the roadside radio device 131 transmits the frequency channel allocation signal to the in-vehicle radio device 111 which is the transmission source of the frequency channel request signal.

The radio data generation unit 340 is connected to the SAM 330 and the radio signal modulation unit 370. The radio data generation unit 340 generates a radio data packet by appending a radio unit header to the SAM data packet received from the SAM 330. The radio data generation unit 340 outputs the radio data packet to the radio signal modulation unit 370.

The SAM 330 is connected to the radio data processing unit 350, the radio data generation unit 340, and the application unit 310. When performing reception processing, the SAM 330 receives demodulated SAM data packet from the radio data processing unit 350. The SAM 330 performs demodulation processing on the SAM data packet to demodulate the application data packet. Specifically, the SAM 330 performs processing of removing the SAM header and the application related information from the SAM data packet and including the vehicle identification information included in the application related information in the application data. In addition, the SAM 330 may perform processing of including, in the application data, a part of information other than the SAM header and the vehicle identification information included in the application related information. The SAM 330 outputs the application data packet demodulated in this manner to the application unit 310.

In addition, when performing transmission processing, the SAM 330 receives the application data packet from the application unit 310. The SAM 330 generates a SAM data packet by appending a SAM header and application related information to the application data packet. The SAM 330 is connected to the radio data generation unit 340 and outputs the generated SAM data packet to the radio data generation unit 340.

When the roadside radio device 131 starts data transmission processing to the in-vehicle radio device 111, the application unit 310 generates an application data packet. An application data packet includes an application header, communication type information, and application data. The application unit 310 outputs the application data packet to the radio unit 320.

When the roadside radio device 131 receives data from the in-vehicle radio device 111, the application unit 310 receives the demodulated application data packet from the radio unit 320. The demodulated application data packet includes communication type information and application data. The communication type information is information given by the application unit 210 of the in-vehicle radio device 111. In addition, the application data includes vehicle identification information by demodulation processing performed by the SAM 330. The vehicle identification information is information given by the radio unit 220 of the in-vehicle radio device 111.

The application unit 310 includes a vehicle class information comparison unit 311. The vehicle class information comparison unit 311 compares the vehicle identification information and the communication type information included in the application data packet. As described above, since common vehicle class information is used in the vehicle identification information and the communication type information, the vehicle class information comparison unit 311 compares two vehicle class information items included in the application data packet.

Further, if the application executed by the application unit 210 of the in-vehicle radio device 111 is not tampered with, that is, if the radio data packet is not transmitted from the spoofing radio device, the vehicle identification information and the communication type information included in the application data packet should match. Therefore, by comparing the vehicle identification information and the communication type information included in the application data packet, the application unit 310 of the roadside radio device 131 can determine whether the in-vehicle radio device 111 which is the transmission source of the radio data packet is a spoofing radio device.

When the vehicle class information comparison unit 311 determines that the vehicle identification information and the communication type information match, the application unit 310 processes the application data. That is, the application data is determined not to be data transmitted from the spoofing radio device and is utilized by the application unit 310.

On the other hand, when the vehicle class information comparison unit 311 determines that the vehicle identification information and the communication type information do not match, the application unit 310 generates, as information of the spoofing radio device, information for identifying the radio device which is the transmission source, for example, information of the MAC address included in the application data.

The application unit 310 is connected to the frequency channel allocation control unit 360 and outputs the information of the spoofing radio device to the frequency channel allocation control unit 360. In addition, the application unit 310 treats the application data as invalid data. For example, the application unit 310 does not process the application data or discards the application data.

Figure 6:
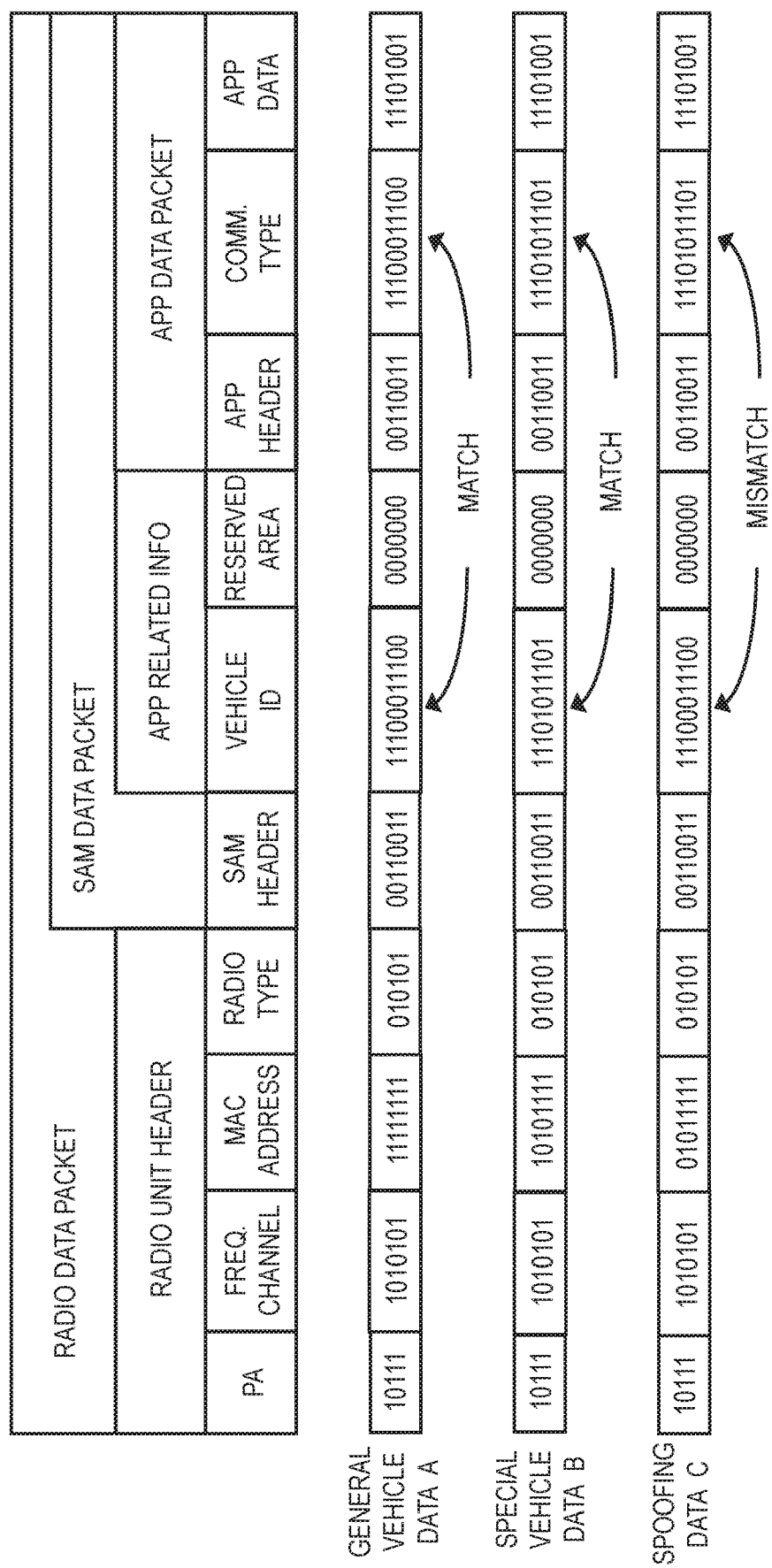
FIG. 6 is a structure diagram showing data structure of radio data packets transmitted from the in-vehicle radio devices.

Next, specific examples of radio data packets transmitted from the in-vehicle radio device will be described. FIG. 6 is a structure diagram showing data structure of radio data packets transmitted from the in-vehicle radio devices. FIG. 6 shows, in order from the top, a data structure of a radio data packet, an example of data A (general vehicle data A) of a radio data packet in the case where a vehicle in which a radio device is mounted is a general vehicle, an example of data 3 (special vehicle data B) of a radio data packet in the case where a vehicle in which a radio device is mounted is a special vehicle, and an example of data C (spoofing data C) of a radio data packet in the case where an in-vehicle radio device is a spoofing radio device.

As shown in FIG. 6, "11100011100" is used as vehicle class information for the general vehicle. In addition, "11101011101" is used as vehicle class information for the special vehicle. These vehicle class information are commonly used in the vehicle identification information generated by the radio unit 220 and the communication type information generated by the application unit 210.

The general vehicle data A and the special vehicle data B are not data transmitted from the spoofing radio device, in other words, data transmitted from a normal radio device. That is, the vehicle identification information and the communication type information included in the general vehicle data A match. Further, the vehicle identification information and the communication type information included in the special vehicle data B match. Therefore, the vehicle class information comparison unit 311 determines that the general vehicle data A and the special vehicle data B are not data transmitted from the spoofing radio device.

In contrast, the spoofing data C is data transmitted from the spoofing radio device, that is, data transmitted from an abnormal radio device. In the example shown in FIG. 6, the spoofing radio device of the spoofing data C is configured by a combination of the radio unit 220 for the general vehicle and the application unit 210 for the special vehicle. That is, the vehicle identification information. "11101011101" and the communication type information "11100011100" do not match. Therefore, as a result of the comparison processing, the vehicle class information comparison unit 311 determines that the spoofing data C is data transmitted from the spoofing radio device. In this way, the spoofing radio device is detected.

When the spoofing radio device (radio communication device) is detected, for example, the information of the MAC address included in the application data by the demodulation processing is registered as the information of the spoofing radio device in the frequency channel allocation management information of the allocation management information storage unit 362. As shown in FIG. 6, information unique to each radio device is used for the MAC address. Therefore, if the MAC address used in the spoofing radio device is held as information of the spoofing radio device, the roadside radio device 131 can properly identify the spoofing radio device and the normal radio.

Although the above description exemplifies that the MAC address is used as information for identifying a spoofing radio device, the present disclosure is not limited thereto. That is, the information may be other than the MAC address as long as the information can identify the radio device. For example, information held by each SAM included in the SAM header that is difficult to tamper with may be used as information identifying the radio device. In this case, when demodulating the application data packet, the SAM 330 performs processing of including, in the application data, the information that is included in the SAM header and that can identify the radio device.

In addition, the data structure of the radio data packet shown in FIG. 6 does not display all the data. Needless to say, the radio data packet has other data areas such as information for packet management, information indicating the end of the packet, and information for error correction.

As described above, the radio unit of the roadside radio device according to the first embodiment includes the SAM that includes the vehicle identification information given by the radio unit of the in-vehicle radio device in the application data and outputs the application data to the application unit of the roadside radio device. Further, the application unit of the roadside radio device according to the first embodiment includes the vehicle class information comparison unit for comparing the vehicle identification information and the communication type information included in the application data.

When the vehicle class information comparison unit determines that the vehicle identification information and the communication type information match, the application unit of the roadside radio device processes the application data received from the radio unit of the roadside radio device. In this case, the roadside radio device determines that the in-vehicle radio device which is the transmission source of the radio data packet is not the spoofing radio device.

On the other hand, when the vehicle class information comparison unit determines that the vehicle identification information and the communication type information do not match, the application unit of the roadside radio device treats the application data received from the radio unit of the roadside radio device as invalid data. For example, the application unit of the roadside radio device does not process the application data or discards the application data. In this case, the roadside radio device determines that the in-vehicle radio device which is the transmission source of the radio data packet is the spoofing radio device.

As described above, even in the case where the in-vehicle radio device is the spoofing radio device due to tampering with the application executed by the application unit of the in-vehicle radio device, the application unit of the roadside radio device can detect the spoofing radio device by comparing the vehicle identification information and the communication type information transmitted from the spoofing radio device. As a result, it is possible to prevent a problem that communication by the normal radio devices is inhibited due to communication by the spoofing radio device.

Since the roadside radio device detects the spoofing radio device by comparing the vehicle identification information and the communication type information transmitted from the spoofing radio device, the roadside radio device at least once allocates the frequency channel to the spoofing radio device. That is, when starting radio communication, the spoofing radio device transmits a frequency channel request signal to the roadside radio device. In contrast, the roadside radio device transmits a frequency channel allocation signal and allocates a frequency channel for the spoofing radio device. However, if the spoofing radio device subsequently transmits a radio data packet using the allocated frequency channel, the roadside radio device may determine that the source of the radio data packet is the spoofing radio device. The roadside radio device treats the radio data packet (application data) transmitted from the radio device determined to be the spoofing radio device as invalid data, and does not allocate a frequency channel again even if the roadside radio device receives a frequency channel request signal transmitted from the radio device determined to be the spoofing radio device. In this manner, the roadside radio device can exclude the spoofing radio device from the radio communication system. 0 0 0 1

Second Embodiment

Figure 7:
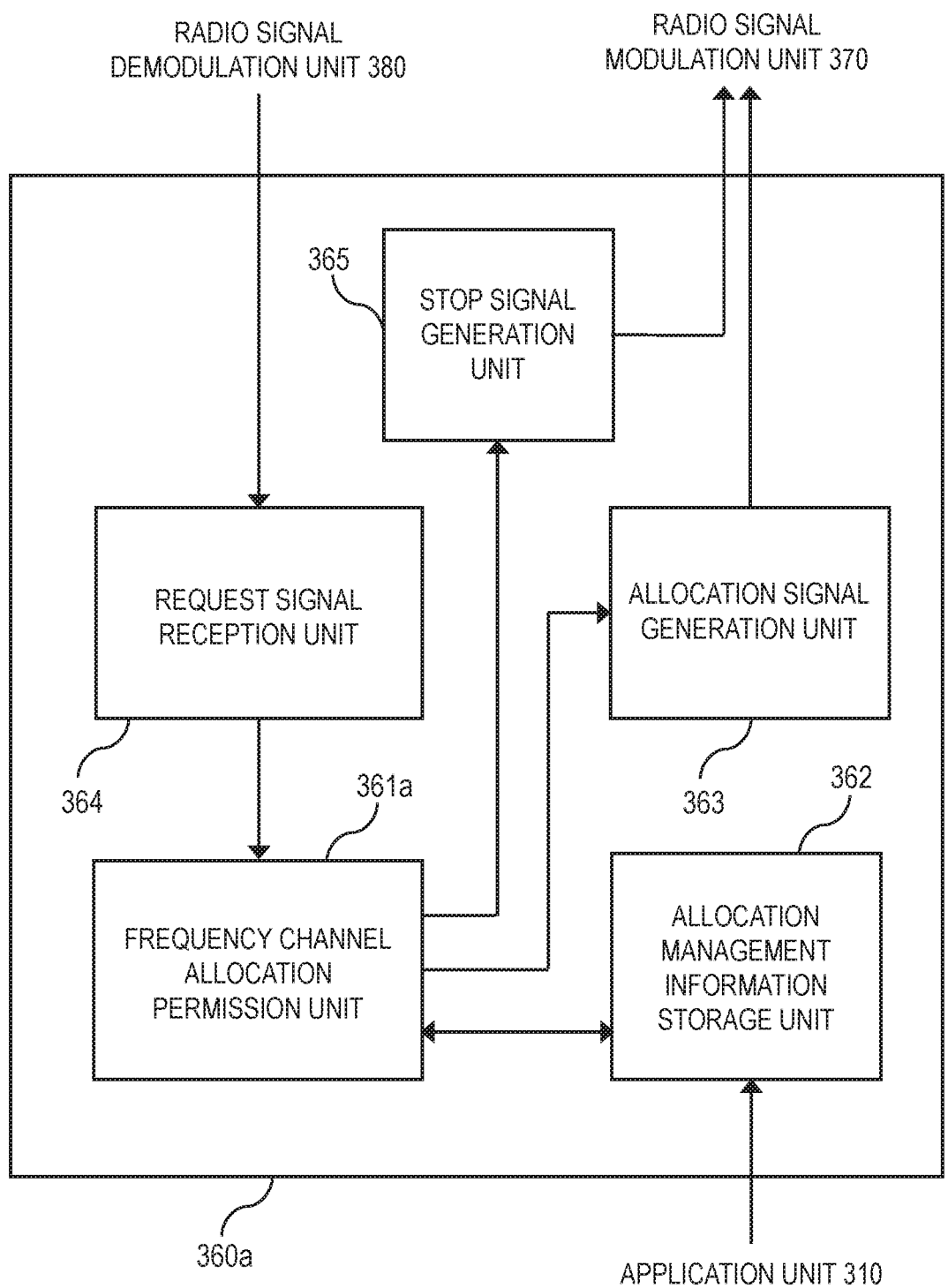
FIG. 7 is a block diagram showing an example of a configuration of a frequency channel allocation control unit according to a second embodiment.

Next, a second embodiment will be described. A roadside radio device according to the second embodiment differs from the roadside radio device according to the first embodiment in that when receiving a frequency channel request signal from a spoofing radio device, the roadside radio device according to the second embodiment transmits an operation stop request signal for stopping the radio unit to the spoofing radio device. FIG. 7 is a block diagram showing an example of configuration of a frequency channel allocation control unit 360a according to the second embodiment. The frequency channel allocation control unit 360a corresponds to another embodiment of the frequency channel allocation control unit 360.

As shown in FIG. 7, the frequency channel allocation permission unit 361 of the frequency channel allocation control unit 360 of FIG. 5 is changed to a frequency channel allocation permission unit 361a addition, the frequency channel allocation control unit 360a includes a stop signal generation unit 365 in addition to the configuration of the frequency channel allocation control unit 360 shown in FIG. 5.

When receiving the frequency channel request signal from the request signal reception unit 364, the frequency channel allocation permission unit 361a reads out the frequency channel allocation management information from the allocation management information storage unit 362. The frequency channel allocation permission unit 361a confirms whether the in-vehicle radio that is the transmission source of the frequency channel request signal is registered as a spoofing radio device based on the read frequency channel allocation management information.

When determining that the in-vehicle radio device which is the transmission source of the frequency channel request signal is the spoofing radio device, the frequency channel allocation permission unit 361*a* treats the frequency channel request signal as an invalid signal and generates an operation stop instruction signal for instructing the operation stop of the radio unit of the in-vehicle radio device. The generated operation stop instruction signal is output to the stop signal generation unit 365.

When receiving the operation stop instruction signal, the stop signal generation unit 365 generates an operation stop request signal for requesting the operation stop of the radio unit to the in-vehicle radio device which is the transmission source of the frequency channel request signal. That is, when the frequency channel allocation permission unit 361*a* determines not to allocate a frequency channel to the in-vehicle radio device which is the transmission source of the frequency channel request signal, the stop signal generation unit 365 generates the operation stop request signal. The operation stop request signal is transmitted to the in-vehicle radio device which is the transmission source of the frequency channel request signal via the radio signal modulation unit 370.

Figure 8:
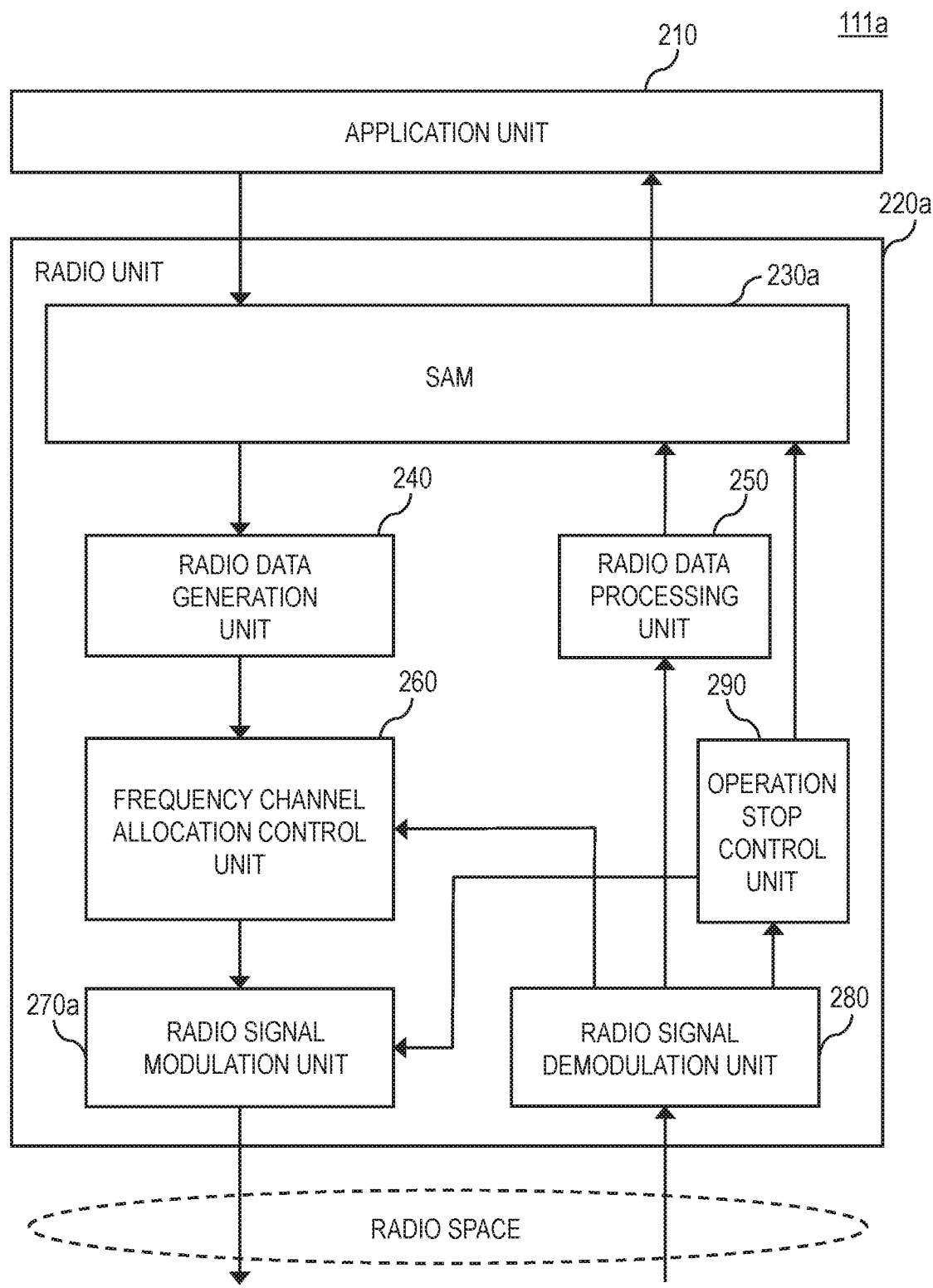
FIG. 8 is a block diagram showing an example of a configuration of an in-vehicle radio device according to the second embodiment.

FIG. 8 is a block diagram showing an example of a configuration of an in-vehicle radio device 111*a* according to the second embodiment. The in-vehicle radio device 111*a* corresponds to another embodiment of the in-vehicle radio devices 111 and 121. As shown in FIG. 8, the radio unit 220, the SAM 230, and the radio signal modulation unit 270 of the in-vehicle radio device 111 of FIG. 2 are changed to a radio unit 220*a*, a SAM 230*a*, and a radio signal modulation unit 270*a*, respectively. Further, the radio unit 220*a* includes an operation stop control unit 290 in addition to the configuration of the radio unit 220 shown in FIG. 2.

The operation stop control unit 290 is connected to the SAM 230*a*, the radio signal modulation unit 270*a*, and the radio signal demodulation unit 280, The operation stop control unit 290 receives the operation stop request signal transmitted from the roadside radio device via the radio signal demodulation unit 280. The operation stop control unit 290 performs control for stopping the operation of the radio unit 220*a* based on the operation stop request signal.

For example, the operation stop control unit 290 outputs a control signal for stopping modulation processing to the radio signal modulation unit 270*a* based on the operation stop request signal. The radio signal modulation unit 270*a* stops the modulation processing in response to the control signal from the operation stop control unit 290. As a result, the in-vehicle radio device 111*a* cannot transmit data such as a radio data packet.

Further, for example, the operation stop control unit 290 outputs a control signal for stopping signal processing for transmission and reception data to the SAM 230*a* based on the operation stop request signal. The SAM 230*a* stops the signal processing for the transmission and reception data in response to the control signal from the operation stop control unit 290. As a result, the in-vehicle radio device 111*a* cannot perform the transmission and reception processing related to a radio data packet.

As described above, the roadside radio device according to the second embodiment transmits the operation stop request signal for requesting the operation stop of the radio unit to the in-vehicle radio device registered as the spoofing radio device. Further, when receiving the operation stop request signal, the in-vehicle radio device according to the second embodiment performs the control for stopping the operation of the radio unit. As a result, it is possible to reliably exclude the abnormal in-vehicle radio device registered as the spoofing radio device in the roadside radio device from the radio communication system.

Third Embodiment

Next, a third embodiment will be described. In the first and second embodiments, it has been described to detect the spoofing radio device whose application unit is tampered with by detecting the deference between the vehicle identification information given by the radio unit of the in-vehicle radio device and the communication type information given by the application unit of the in-vehicle radio device. However, in the techniques of the first and second embodiments, if spoofing is performed by copying both the vehicle identification information and the communication type information included in the radio data packet of the normal in-vehicle radio device, the spoofing cannot be detected. In the third embodiment, an embodiment in which spoofing can be detected even in a spoofing radio device in which vehicle identification information and communication type information are the same will be described.

Figure 9:
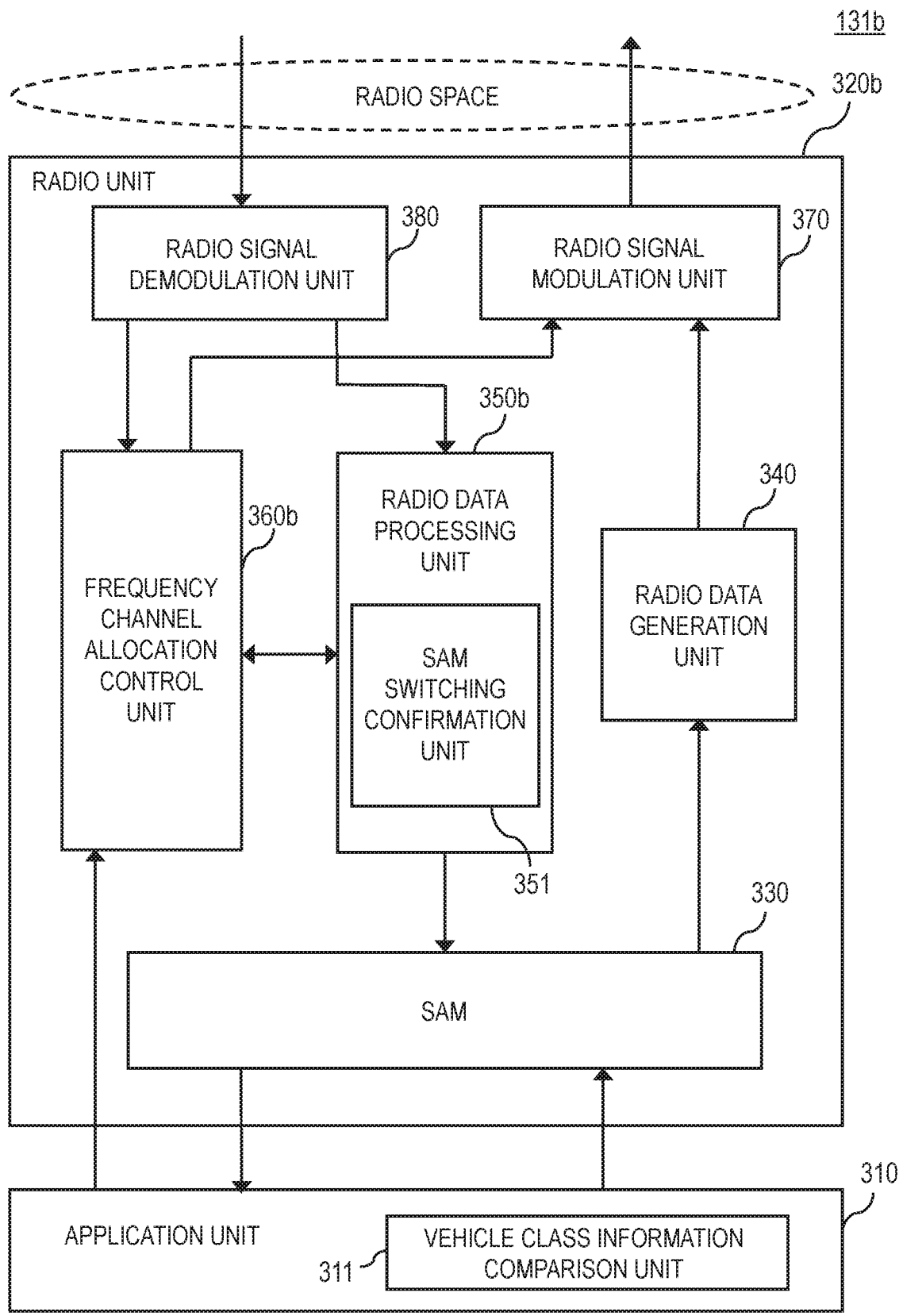
FIG. 9 is a block diagram showing an example of configuration of a roadside radio device according to a third embodiment.

FIG. 9 is a block diagram showing an example of a configuration of a roadside radio device 131*b* according to the third embodiment. The roadside radio device 131*b* corresponds to another embodiment of the roadside radio device 131. As shown in FIG. 9, the radio unit 320, the radio data processing unit 350, and the frequency channel allocation control unit 360 of the roadside radio device 131 of FIG. 4 are changed to a radio unit 320*b*, a radio data processing unit 350*b*, and a frequency channel allocation control unit 360*b*, respectively. In addition, the radio data processing unit 350*b* includes a SAM switching confirmation unit 351.

Figure 10:
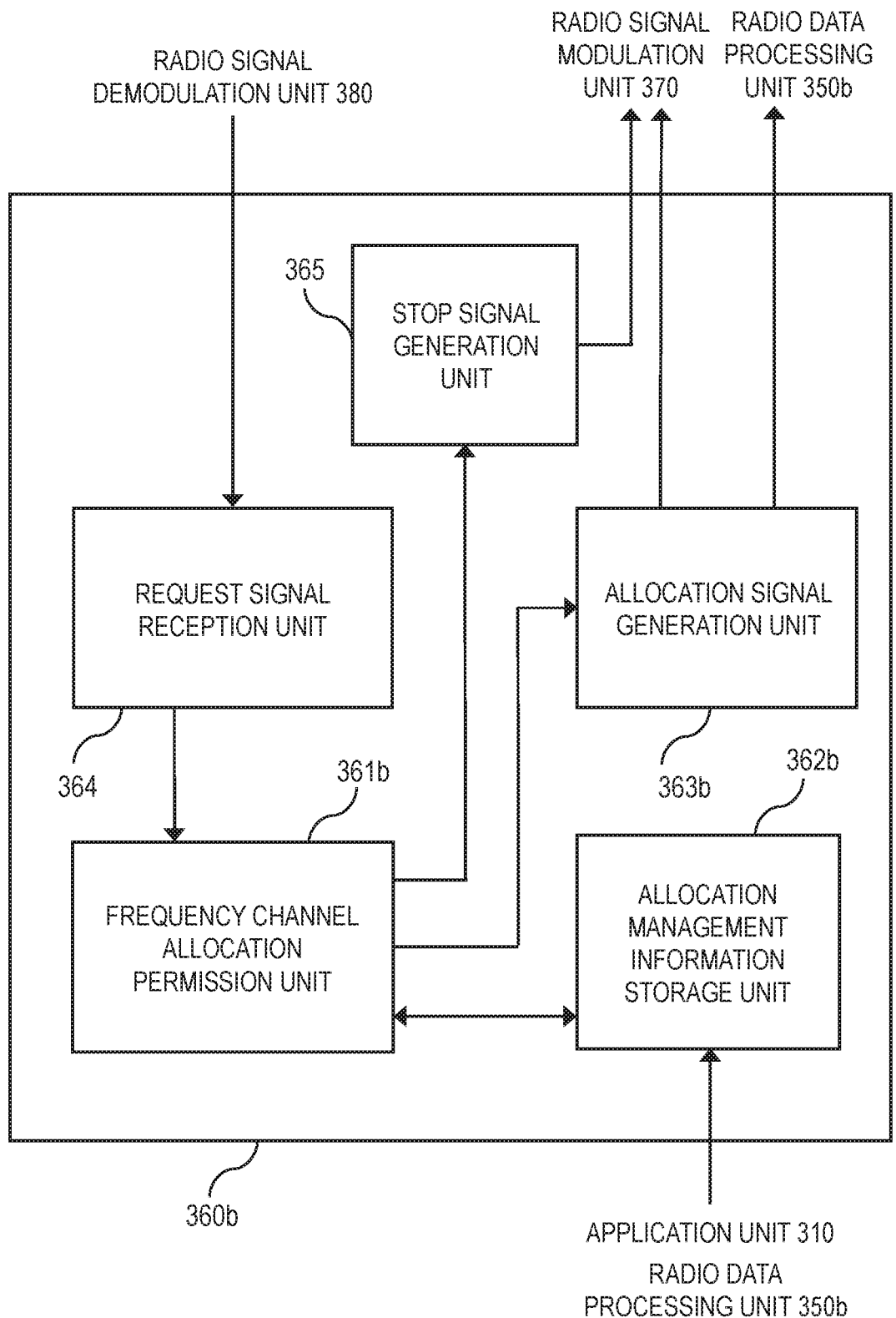
FIG. 10 is a block diagram showing an example of a configuration of a frequency channel allocation control unit according to the third embodiment.

FIG. 10 is a block diagram showing an example of a configuration of the frequency channel allocation control unit 360*b* according to the third embodiment. As shown in FIG. 10, the frequency channel allocation permission unit 361*a*, the allocation management information storage unit 362, and the allocation signal generation unit 363 of the frequency channel allocation control unit 360*a* of FIG. 7 are changed to a frequency channel allocation permission unit 361*b*, an allocation management information storage unit 362*b*, and an allocation signal generation unit 363*b*, respectively.

Figure 11:
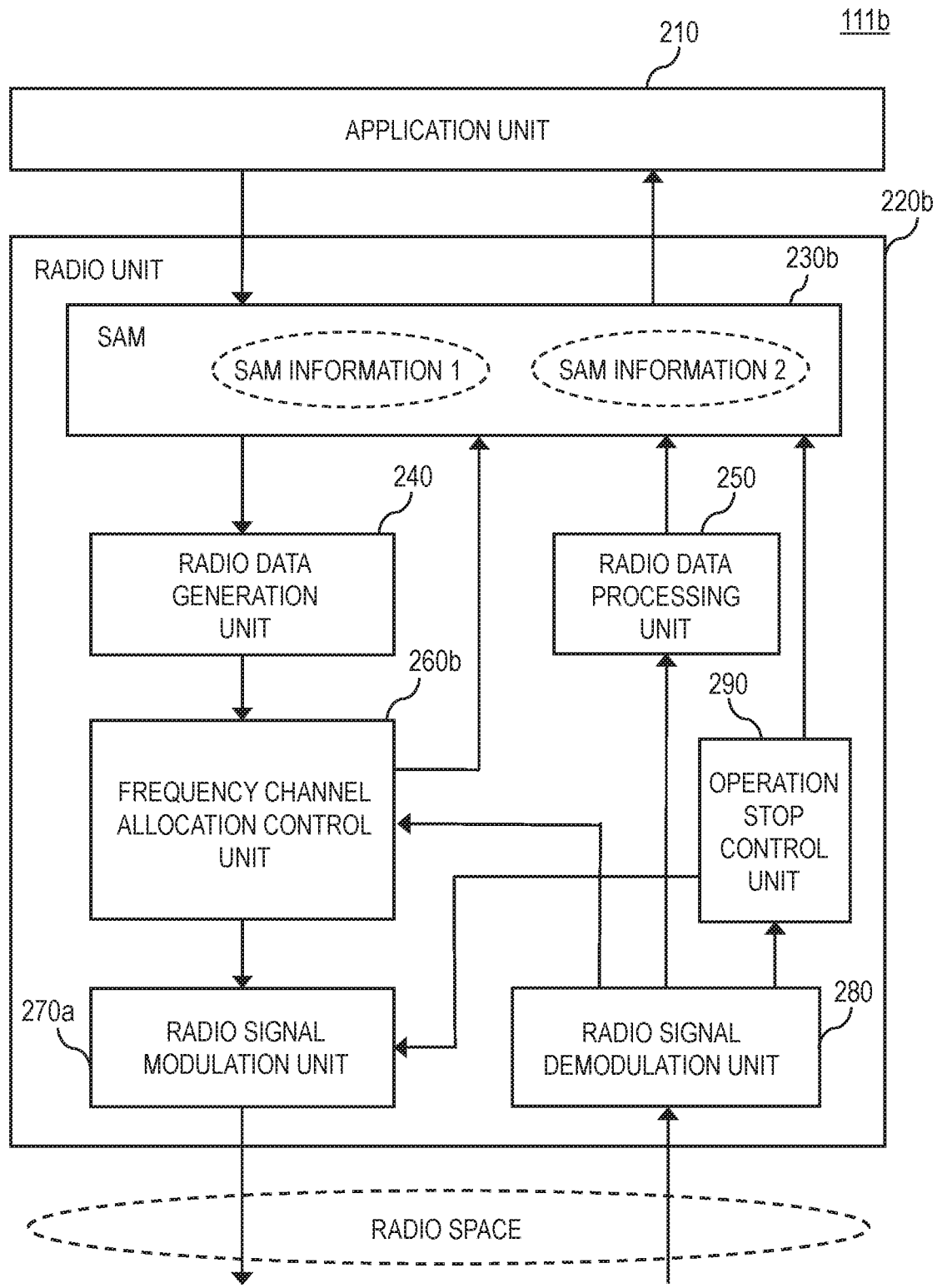
FIG. 11 is a block diagram showing an example of a configuration of an in-vehicle radio device according to the third embodiment.

FIG. 11 is a block diagram showing an example of a configuration of an in-vehicle radio device 111*b* according to the third embodiment. The in-vehicle radio device 111*b* corresponds to another embodiment of the in-vehicle radio device 111. As shown in FIG. 11, the radio unit 220*a*, the SAM 230*a*, and the frequency channel allocation control unit 260 of the in-vehicle radio device 111*a* of FIG. 8 are changed to a radio unit 220*b*, a SAM (second SAM) 230*b*, and a frequency channel allocation control unit 260*b*, respectively.

Figure 12:
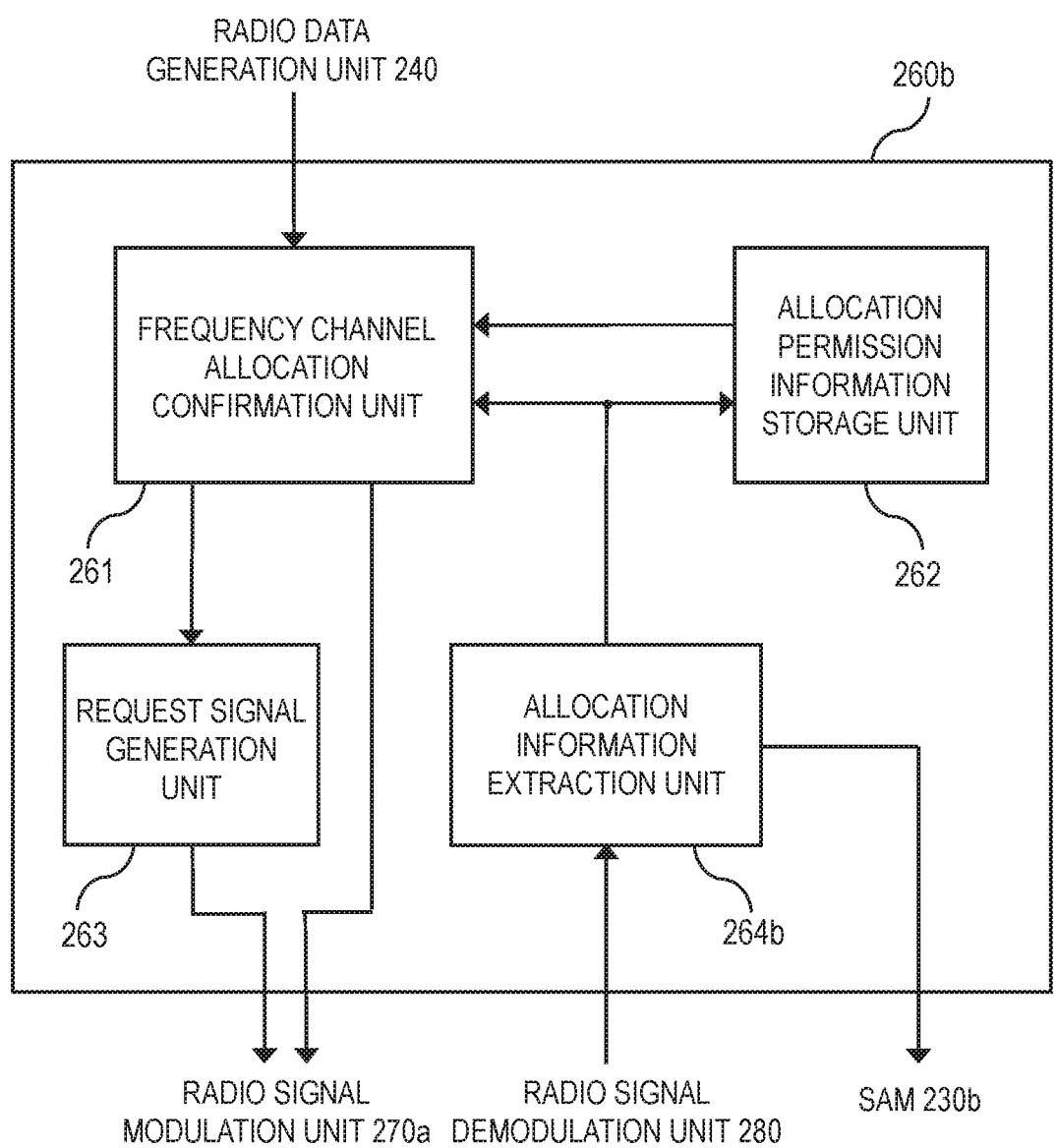
FIG. 12 is a block diagram showing an example of a configuration of a frequency channel allocation control unit according to the third embodiment.

FIG. 12 is a block diagram showing an example of a configuration of the frequency channel allocation control unit 260*b* according to the third embodiment. As shown in FIG. 12, the allocation information extraction unit 264 of the frequency channel allocation control unit 260 of FIG. 3 is changed to an allocation information extraction unit 264*b*.

Next, referring to FIGS. 9 to 12, the functions and operations of the respective blocks of the roadside radio device 131*b* and the in-vehicle radio device 111*b* according to the third embodiment will be described in accordance with the process flow. First, as shown in FIG. 10, when receiving the first frequency channel request signal transmitted from the in-vehicle radio device 111b, the frequency channel allocation permission unit 361b outputs, to the allocation signal generation unit 363b, information of a frequency channel to be permitted, and a control signal for instructing generation of a frequency channel allocation signal and a SAM information switching request signal.

When receiving the control signal for instructing the generation of the frequency channel allocation signal and the SAM information switching request signal from the frequency channel allocation permission unit 361b, the allocation signal generation unit 363b generates the frequency channel allocation signal including the information of the frequency channel to be permitted to the in-vehicle radio device 111b, and the SAM information switching request signal. The generated frequency channel allocation signal and the generated SAM information switching request signal is transmitted to the in-vehicle radio device 111b via the radio signal modulation unit 370. Incidentally, the frequency channel allocation signal and the SAM information switching request signal may be transmitted to the in-vehicle radio device 111b as one signal. In addition, the allocation signal generation unit 363b is connected to the radio data processing unit 350b and notifies the radio data processing unit 350b that the SAM information switching request signal has been output.

As shown in FIG. 12, when receiving the frequency channel allocation signal and the SAM information switching request signal transmitted from the roadside radio device 131b, the allocation information extraction unit 264b extracts the information of the frequency channel to be permitted from the frequency channel allocation signal. The extracted information of the frequency channel is output to the frequency channel allocation confirmation unit 261 and the allocation permission information storage unit 262. In addition, the allocation information extraction unit 264b is connected to the SAM 230b and outputs a SAM information switching instruction signal to the SAM 230b.

As shown in FIG. 11, the SAM 230b holds a plurality of SAM information, e.g., SAM information 1 and SAM information 2. When receiving the SAM information switching instruction signal from the allocation information extraction unit 264b of the frequency channel allocation control unit 260b, the SAM 230b performs switching processing for the SAM information. Specifically, the SAM 230b generates a plurality of SAM data packets including SAM headers in which different SAM information are used. As described above, when the switching processing for the SAM information is performed in the SAM 230b, the in-vehicle radio device 111b transmits a plurality of radio data packets including different SAM information in the transmission processing.

As shown in FIG. 9, the radio data processing unit 350b receives the plurality of radio data packets transmitted from the in-vehicle radio device 111b using the permitted frequency channel. When the allocation signal generation unit 363b of the frequency channel allocation control unit 360b notifies the radio data processing unit 350b that the SAM information switching request signal has been output, the SAM switching confirmation unit 351 refers to the SAM header of the received radio data packet and confirms whether the switching processing for the SAM information has been performed. For example, the SAM switching confirmation unit 351 can confirm whether the switching processing for the SAM information has been performed by confirming the plurality of radio data packets having different data strings included in the SAM headers.

When the SAM switching confirmation unit 351 confirms that the switching processing for the SAM information has been performed, the radio data processing unit 350b determines that the in-vehicle radio device 111b is not a spoofing radio device. In this case, the received radio data packets are output to the SAM 330. On the other hand, when the SAM switching confirmation unit 351 cannot confirm that the switching processing for the SAM information has been performed, the radio data processing unit 350b determines that the in-vehicle radio device 111b is a spoofing radio device. This is because the spoofing radio device cannot perform the switching processing for the SAM information in response to the SAM information switching request signal. In this case, the radio data processing unit 350b treats the received radio data packets as invalid data and generates information of the spoofing radio device. The generated information of the spoofing radio device is output from the radio data processing unit 350b to the allocation management information storage unit 362b and registered in the frequency channel allocation management information. In addition, an operation stop request signal may be output from the roadside radio device 131b to the in-vehicle radio device 111b.

Incidentally, if an in-vehicle radio device is a normal in-vehicle radio device and spoofing is performed, but the in-vehicle radio device has been registered in the frequency channel allocation management information, as a spoofing radio device, the in-vehicle radio device is determined as a spoofing radio device and cannot perform radio communication. In order to prevent this, even in the case of the in-vehicle radio registered as the spoofing radio device in the frequency channel allocation management information, a frequency channel may be allocated in the first radio communication, and the switching processing for the SAM information may be performed. At this time, if it is confirmed that the switching processing for the SAM information can be normally performed, it is determined that the in-vehicle radio device is not the spoofing radio device. In this case, the SAM information used for the spoofing may not be used in the future.

In the first to third embodiments, the configurations and the functions of the in-vehicle radio device and the roadside radio device have been described with respect to the drawings. The functions of the blocks in the drawings may be configured by hardware (H/W), software (S/W), or a combination of H/W and S/W.

Figure 13:
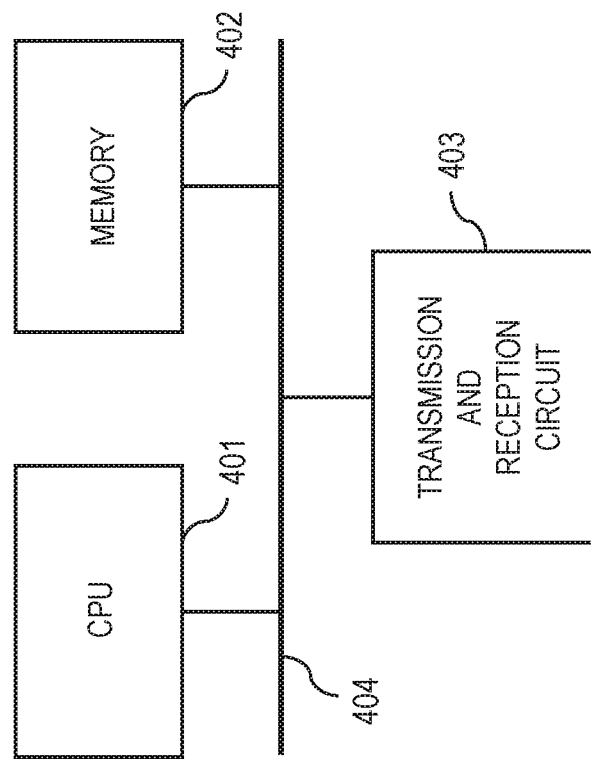
FIG. 13 is a block diagram showing an example of a hardware configuration of the in-vehicle radio device and the roadside radio device.

FIG. 13 is a block diagram showing an example of the H/W configuration of the in-vehicle radio device and the roadside radio device. As shown in FIG. 13, a Central Processing Unit (CPU) 401, a memory 402, and a transmission and reception circuit 403 are connected to each other via a bus 404. For example, the radio signal modulation unit and the radio signal demodulation unit according to the first to third embodiments may be configured by the transmission and reception circuit 403. Further, for example, the application unit, the SAM, the radio data generation unit, the radio data processing unit, the frequency channel allocation control unit, and the like according to the first to third embodiments may be realized by the CPU 401 reading a predetermined program stored in the memory 402 and executing the read program. That is, the application unit, the SAM, the radio data generation unit, the radio data processing unit, the frequency channel allocation control unit, and the like may be configured by a combination of H/W and S/W.

The in-vehicle radio devices according to the first to third embodiments are not limited to an aspect in which the radio communication device is incorporated in the vehicle body as a part of a component. For example, an aspect in which a mobile terminal, such as a smartphone is brought into a vehicle may also be included.

Although the invention made by the present inventors has been specifically described based on the embodiments, it is needless to say that the present invention is not limited to the above-described embodiments, and various changes may be made without departing from the scope thereof.

What is claimed is:

1. A roadside radio device, comprising:
a first radio unit configured to receive a radio data packet from an in-vehicle radio device; and
a first application unit configured to receive application data included in the radio data packet,
wherein the radio data packet includes vehicle identification information given by a second radio unit of the in-vehicle radio device, and communication type information given by a second application unit of the in-vehicle radio device,
wherein the vehicle identification information comprises information indicating a vehicle in which the in-vehicle radio device is mounted,
wherein the communication type information comprises information indicating a vehicle to which the application data relates,
wherein the vehicle identification information and the communication type information are indicated using vehicle class information identifying a type of vehicles,
wherein the first radio unit comprises a first Secure Application Module (SAM) configured to include the vehicle identification information in the application data to output the application data to the first application unit,
wherein the first application unit comprises a vehicle class information comparison unit configured to compare the vehicle identification information with the communication type information,
wherein, when the vehicle class information comparison unit determines that the vehicle identification information and the communication type information matches, the first application unit is configured to process the application data received from the first radio unit,
wherein, when the vehicle class information comparison unit determines that the vehicle identification information and the communication type information do not match, the first application unit is configured to treat, as invalid data, the application data received from the first radio unit, and to generate information identifying the in-vehicle radio device as information of a spoofing radio device, and
wherein, when receiving a frequency channel request signal for requesting allocation of a frequency channel for radio communication from the in-vehicle radio device, the first radio unit further comprises a first frequency channel allocation control unit configured to determine whether to allocate the frequency channel to the in-vehicle radio device based on the information of the spoofing radio device.

2. The roadside radio device according to claim 1,
wherein the first frequency channel allocation control unit comprises:
an allocation management information storage unit configured to store frequency channel allocation management information; and
a frequency channel allocation permission unit configured to operate in response to the frequency channel request signal,
wherein the allocation management information storage unit is configured to register the information of the spoofing radio device in the frequency channel allocation management information, and
wherein the frequency channel allocation permission unit is configured to:
determine whether to allocate the frequency channel to the in-vehicle radio device based on the frequency channel allocation management information; and
determine the frequency channel to be permitted to the in-vehicle radio device when determining to allocate the frequency channel to the in-vehicle radio device.

3. The roadside radio device according to claim 2,
wherein the first frequency channel allocation control unit further comprises an allocation signal generation unit configured to generate a frequency channel allocation signal including information of the frequency channel to be permitted to the in-vehicle radio information, and
wherein the first radio unit is configured to transmit the frequency channel allocation signal to the in-vehicle radio device.

4. The roadside radio device according to claim 1,
wherein the first radio unit further comprises a radio data processing unit configured to:
perform processing of including, in the application data, a Media Access Control (MAC) address included in the radio data packet to generate a SAM data packet including the vehicle identification information and the application data; and
output the SAM data packet to the first SAM, and
wherein information for specifying the in-vehicle radio device comprises the MAC address included in the application data.

5. The roadside radio device according to claim 2,
wherein the first frequency channel allocation control unit further comprises a stop signal generation unit configured to generate an operation stop request signal for requesting an operation stop of the second radio unit, and
wherein, when the frequency channel allocation permission unit determines not to allocate the frequency channel to the in-vehicle radio device, the stop signal generation unit is configured to generate the operation stop request signal.

6. A radio communication system comprising:
the roadside radio device according to claim 3; and
the in-vehicle radio device configured to perform radio communication with the roadside radio device,
wherein the in-vehicle radio device comprises:
the second application unit configured to generate an application data packet including the communication type information and the application data; and
the second radio unit configured to generate the radio data packet including the vehicle identification information and the application data packet to transmit the radio data packet to the roadside radio device.

7. The radio communication system according to claim 6,
wherein the second radio unit comprises a second frequency channel allocation control unit configured to confirm whether the frequency channel for the radio communication is allocated to the in-vehicle radio device, and
wherein, when the second frequency channel allocation control unit confirms that the frequency channel for the radio communication is allocated to the in-vehicle radio device, the second radio unit is configured to transmit the radio data packet to the roadside radio device using a allocated frequency channel.

8. The radio communication system according to claim 7, wherein, when confirming that the frequency channel for the radio communication is not allocated to the in-vehicle radio device, the second frequency channel allocation control unit is configured to generate the frequency channel request signal, and
wherein the second radio unit is configured to transmit the frequency channel request signal to the roadside radio device using a combination of frequency channels for a frequency channel request.

9. The radio communication system according to claim 8, wherein the second frequency channel allocation control unit comprises:
an allocation permission information storage unit configured to store a frequency channel allocation permission information indicating the frequency channel allocated to the in-vehicle radio device; and
a frequency channel allocation confirmation unit configured to confirm whether the frequency channel is allocated to the in-vehicle radio device based on the frequency channel allocation permission information.

10. The radio communication system according to claim 9, wherein the second frequency channel allocation control unit further comprises an allocation information extraction unit configured to:
extract the information of the frequency channel to be permitted from the frequency channel allocation signal transmitted from the roadside radio device; and
register, as information of the frequency channel allocated to the in-vehicle radio device, an extracted information of the frequency channel in the frequency channel allocation permission information.

11. The radio communication system according to claim 10,
wherein the first frequency channel allocation control unit further comprises a stop signal generation unit configured to generate an operation stop request signal for requesting an operation stop of the second radio unit,
wherein the second radio unit further comprises an operation stop control unit configured to control the operation stop of the second radio unit,
wherein, when the frequency channel allocation permission unit determines not to allocate the frequency channel to the in-vehicle radio device, the stop signal generation unit is configured to generate the operation stop request signal,
wherein the first radio unit is configured to transmit the operation stop request signal to the in-vehicle radio device, and
wherein the operation stop control unit is configured to control for the operation stop of the second radio unit based on the operation stop request signal.

12. The radio communication system according to claim 10,
wherein the allocation signal generation unit is configured to generate a SAM information switching request signal,
wherein the first radio unit is configured to transmit the SAM information switching request signal to the in-vehicle radio device, and wherein the second radio unit further comprises a second SAM configured to perform SAM information switching processing based on the SAM information switching request signal.

13. The radio communication system according to claim 12,
wherein the in-vehicle radio device is configured to transmit a plurality of radio data packets including different SAM information to the roadside radio device, and
wherein the first radio unit further comprises a SAM switching confirmation unit configured to refer information of SAM headers included in the plurality of radio data packets including the different SAM information to confirm whether the SAM information switching processing is performed.

14. A roadside radio device comprising:
a first radio unit configured to receive a radio data packet from an in-vehicle radio device; and
a first application unit configured to receive application data included in the radio data packet,
wherein the radio data packet includes vehicle identification information given by a second radio unit of the in-vehicle radio device, and communication type information given by a second application unit of the in-vehicle radio device,
wherein the vehicle identification information comprises information indicating a vehicle in which the in-vehicle radio device is mounted,
wherein the communication type information comprises information indicating a vehicle to which the application data relates,
wherein the vehicle identification information and the communication type information are indicated using vehicle class information identifying a type of vehicles,
wherein the first radio unit comprises a first Secure Application Module (SAM) configured to include the vehicle identification information in the application data to output the application data to the first application unit,
wherein the first application unit comprises a vehicle class information comparison unit configured to compare the vehicle identification information with the communication type information,
wherein, when the vehicle class information comparison unit determines that the vehicle identification information and the communication type information matches, the first application unit is configured to process the application data received from the first radio unit,
wherein, when the vehicle class information comparison unit determines that the vehicle identification information and the communication type information do not match, the first application unit is configured to treat, as invalid data, the application data received from the first radio unit, and
wherein the first radio unit further comprises a first frequency channel allocation control unit configured, when the first radio unit receives a frequency channel request signal for requesting allocation of a frequency channel for radio communication from the in-vehicle radio device, to determine whether to allocate the frequency channel to the in-vehicle radio device based on whether information identifying the in-vehicle radio device is registered in the first radio unit as information of a spoofing radio device.

15. The roadside radio device according to claim 14, wherein, when the vehicle class information comparison unit determines that the vehicle identification information and the communication type information do not match, the first application unit is configured to register information that is included in the radio data packet and identifies the in-vehicle radio device, as information of a spoofing radio device.

16. The roadside radio device according to claim 15,
wherein the first frequency channel allocation control unit comprises:
an allocation management information storage unit configured to store frequency channel allocation management information; and
a frequency channel allocation permission unit configured to operate in response to the frequency channel request signal,
wherein the allocation management information storage unit is configured to register the information of the spoofing radio device in the frequency channel allocation management information, and
wherein the frequency channel allocation permission unit is configured to:
determine whether to allocate the frequency channel to the in-vehicle radio device based on the frequency channel allocation management information; and
determine the frequency channel to be permitted to the in-vehicle radio device when determining to allocate the frequency channel to the in-vehicle radio device.

\* \* \* \* \*